(12) United States Patent
Lakshmipathi et al.

(10) Patent No.: US 11,250,197 B1
(45) Date of Patent: Feb. 15, 2022

(54) CHANNEL LESS FLOOR-PLANNING IN INTEGRATED CIRCUITS

(71) Applicant: QUALCOMM Incorporated, San Diego, CA (US)

(72) Inventors: Vinod Kumar Lakshmipathi, San Diego, CA (US); Venugopal Sanaka, San Diego, CA (US); Babu Suriamoorthy, San Diego, CA (US); Madan Krishnappa, San Diego, CA (US); Pavan Kumar Patibanda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/079,727

(22) Filed: Oct. 26, 2020

(51) Int. Cl.
| | | |
|---|---|---|
| *G06F 30/30* | (2020.01) | |
| *G06F 30/392* | (2020.01) | |
| *G06F 30/347* | (2020.01) | |
| *G06F 30/394* | (2020.01) | |
| *G06F 115/06* | (2020.01) | |
| *G06F 115/10* | (2020.01) | |
| *G06F 115/02* | (2020.01) | |
| *G06F 119/06* | (2020.01) | |

(52) U.S. Cl.
CPC .......... G06F 30/392 (2020.01); G06F 30/347 (2020.01); G06F 30/394 (2020.01); *G06F 2115/02* (2020.01); *G06F 2115/06* (2020.01); *G06F 2115/10* (2020.01); *G06F 2119/06* (2020.01)

(58) Field of Classification Search
CPC ... G06F 30/30–398; G06F 2111/00–20; G06F 2113/00–20; G06F 2115/00–12; G06F 2117/00–12; G06F 2119/00–22
See application file for complete search history.

(56) References Cited

U.S. PATENT DOCUMENTS

| | | | | |
|---|---|---|---|---|
| 7,096,436 | B2 * | 8/2006 | Bednar | G06F 30/39 716/126 |
| 10,747,933 | B2 * | 8/2020 | Bisht | H03K 19/017509 |
| 10,812,079 | B2 * | 10/2020 | Bisht | H03K 19/017509 |
| 2009/0113374 | A1 * | 4/2009 | Nakagawa | G06F 30/394 716/130 |

* cited by examiner

*Primary Examiner* — Leigh M Garbowski
(74) *Attorney, Agent, or Firm* — The Marbury Law Group/Qualcomm

(57) ABSTRACT

Various embodiments may include integrated circuits (ICs) and methods for designing an integrated circuit (IC), such as a system-on-chip (SOC). Embodiments include methods for planning and producing ICs without communication channels, also referred to as channel-less ICs. Embodiments may include overlay hard macros that support routing and communication design without dedicated communication channels being needed between functional hard macros, such as cores of a SOC. Various embodiments may include an IC in which one or more interconnect hard macros and wires connecting a first functional hard macro, a second functional hard macro and the one or more interconnect hard macros are located within a third functional hard macro. In some embodiments, no communication channel may be present between the first functional hard macro, the second functional hard macro, and the third functional hard macro.

27 Claims, 7 Drawing Sheets

CHANNEL LESS FLOOR-PLANNING IN INTEGRATED CIRCUITS

BACKGROUND

New integrated circuits (ICs) are being developed for evolving use cases, such as mobile devices, Internet-of-Things (IoT), wearable devices, and other small form factor devices. With these evolving use cases and growing feature sets associated with ICs, design complexity is consistently increasing.

SUMMARY

Various aspects include integrated circuits (ICs) and methods for designing an integrated circuit (IC), such as a system-on-chip (SOC). Various aspects include ICs without communication or interconnect channels and methods for planning and producing ICs without communication channels, also referred to as channel-less ICs. Various aspects include overlay hard macros that support routing and communication design without dedicated communication channels being needed between functional hard macros, such as cores of a SOC.

Various aspects may include an integrated circuit including a first functional hard macro, a second functional hard macro, a third functional hard macro, one or more interconnect hard macros, the one or more interconnect hard macros located within the third functional hard macro, and wires connecting the first functional hard macro, the second functional hard macro, and the one or more interconnect hard macros. In some aspects, the first functional hard macro may electronically couple to the second functional hard macro through the one or more interconnect hard macros and the wires. In some aspects, sides of the first functional hard macro and sides of the second functional hard macro may not abut. In some aspects, the first functional hard macro and second functional hard macro may abut different sides of the third functional hard macro. In some aspects, no communication channel may be present between the first functional hard macro, the second functional hard macro, and the third functional hard macro. In some aspects, the third functional hard macro may entirely surround each of the one or more interconnect hard macros. In some aspects, the one or more interconnect hard macros may include communication pipeline hard macros. In some aspects, the integrated circuit may be a SOC, and the first functional hard macro, the second functional hard macro, and the third functional hard macro may be a first core, a second core, and a third core, respectively.

Various aspects may include a method for designing an integrated circuit, including determining a first functional hard macro and a second functional hard macro of the integrated circuit requiring a physical communication path with one another, wherein the first functional hard macro and the second functional hard macro are separated from one another by at least a portion of a third functional hard macro of the integrated circuit, determining positions for one or more interconnect hard macros and wires connecting the first functional hard macro, the second functional hard macro, and the one or more interconnect hard macros within the third functional hard macro, generating a wrapper indicating the determined positions of the one or more interconnect hard macros and the wires, and configuring the third functional hard macro according to the wrapper such that the third functional hard macro includes empty boundary zones at the determined positions of the one or more interconnect hard macros and the wires. Various aspects may further include overlaying the one or more interconnect hard macros and the wires into the empty boundary zones in the third functional hard macro. In some aspects, the wires may extend outside the empty boundary zones in the third functional hard macro. In some aspects, the first functional hard macro, the second functional hard macro, and the third functional hard macro may be configured such that no communication channel is present between the first functional hard macro, the second functional hard macro, and the third functional hard macro. In some aspects, the one or more interconnect hard macros may be communication pipeline hard macros. In some aspects, the integrated circuit may be a SOC, and the first functional hard macro, the second functional hard macro, and the third functional hard macro may be a first core, a second core, and a third core, respectively.

Further aspects include a computing device having a processor configured to perform operations of any of the methods summarized above. Further aspects include a computing device having means for performing functions of any of the methods summarized above. Further aspects may include a non-transitory processor-readable storage medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
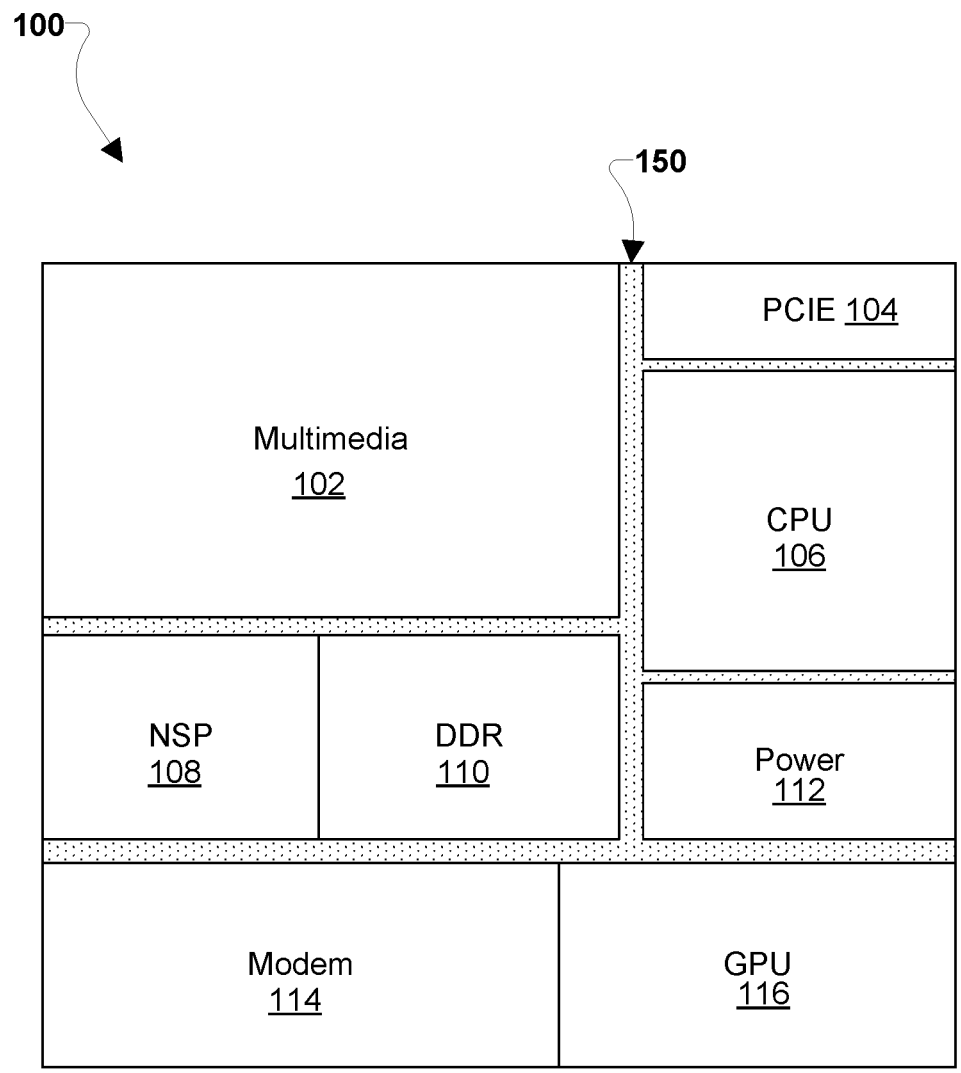
FIG. 1 is a component block diagram illustrating an example "system-on-chip" (SOC) including a communication channel.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the various embodiments or the claims.

Communication channels on conventional ICs represent 2-3% of die area for conventional ICs which represents a proportional increase in die area cost. Die area costs contribute to application-specific integrated circuit (ASIC) unit costs. As die size of conventional ICs is growing with the advent of new feature sets, the cost impact of communication channels on ASIC unit costs is also growing. Power domain restrictions and aggressive power performance area (PPA) targets for conventional ICs have limited cost savings and ASIC unit cost reductions in communication channel design for conventional ICs.

Various embodiments include integrated circuits (ICs) and methods for designing an integrated circuit (IC), such as a system-on-chip (SOC). Embodiments include methods for planning and producing ICs without communication channels, also referred to as channel-less ICs. Embodiments may include overlay hard macros that support routing and communication design without dedicated communication channels being needed between functional hard macros, such as cores of a SOC. Embodiment ICs designed without dedicated communication channels between functional hard macros, such as SOCs designed without dedicated communication channels between cores, may encompass smaller die areas compared to conventionally designed ICs. Reducing the die area of ICs may reduce power consumption compared to conventional ICs. Also, reducing the die area compared to conventional ICs, such as by approximately 1-2%, may reduce ASIC unit costs. Reduced die area and associated power reductions and reduced ASIC unit costs represent improvements in IC design realized by various embodiments in comparison to conventional IC design.

The term "computing device" is used herein to refer to any one or all of cellular telephones, smartphones, portable computing devices, personal or mobile multi-media players, laptop computers, tablet computers, smartbooks, ultrabooks, palmtop computers, electronic mail receivers, multimedia Internet-enabled cellular telephones, servers, wired or wireless router devices, appliances, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless or wired gaming controllers, music and video players, satellite radios, etc.), wireless or wired network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory and a programmable processor.

The term "system-on-chip" (SOC), also sometimes referred to as a "system-on-a-chip", is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system-in-a-package" (SIP) is used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "hard macro" (HM), is used herein to refer to a hardware design of components of a logic function on an IC, such as a SOC, defining how the components within the logic function are interconnected and physical pathways and wiring between those components. Components of hard macros are formed from circuit elements, such as transistors, resistors, capacitors, inductors, etc. Those components of hard macros may be optionally connected directly with one another and/or connected by wires. Hard macros may specify a fixed wiring pattern and may not be modifiable after design. Hard macros may have fixed physical shapes. Examples of hard macros include functional hard macros and interconnect hard macros. The term "functional hard macro" is used herein to refer to a hard macro including one or more components, and optionally wiring therebetween, dedicated to specific IC functional operations, such as cores of a SOC (e.g., a multimedia core, central processing unit (CPU) core, power infrastructure core, memory (e.g., double data rate (DDR) memory) core, modem core, graphics processing unit (GPU) core, Neural Signal Processor (NSP) core, interface connection cores (e.g., peripheral component interconnect express (PCIE) cores, etc.)). The term "interconnect hard macro" is used herein to refer to a hard macro including one or more components, and optionally wiring therebetween, dedicated to communications and routing between other hard macros, such as communication pipeline hard macros, etc. Hard macros, such as functional hard macros, interconnect hard macros, etc., differ from wires (or wiring) as discussed herein. Wires (or wiring) as discussed herein refers to conductive structures, often formed from metal, formed without circuit elements therein.

In conventional IC design, such as conventional SOC design, functional hard macros, such as cores of a SOC, are independently developed and shared across many projects. As ICs, such as SOCs, often require communication among functional hard macros, communication channels are reserved in the conventional IC physical design for pipeline and routing placement. The dedicated communication channels in conventional ICs run between various functional hard macros, such as between cores of a SOC, and can separate the functional hard macros physically from one another. In conventional ICs, the functional hard macros are physically and logically separated from one another by the communication channels and the different functional hard macros, such as different SOC cores, often operate in different voltage domains. As the distance of the functional hard macros from one another may change during design phases of a conventional IC, design of communication channels and accommodating pipeline and clock changes on a conventional IC present significant challenges in IC design.

Various embodiments include methods for planning and producing ICs without communication channels, also referred to as channel-less ICs. Embodiments may include overlay hard macros that support routing and communication design for ICs. In various embodiments, an additional layer of hard macros for an IC, such as an additional layer of interconnect hard macros, may be created to facilitate routing and pipeline placement within a functional hard macro, such as within a core of a SOC.

Various embodiments may include creating a wrapper, such as a design level (DL) one (DL1) wrapper, indicating positions of one or more interconnect hard macros and wires within a functional hard macro. In various embodiments, the wrapper may include indications of empty boundary zones within the functional hard macro which are to remain open during design of the functional hard macro. The indications of empty boundary zones within the functional hard macro may be DL two (DL2) level hard macros or attributes (or constraints) of the DL1 wrapper. The wrapper may include overlay hard macros, such as interconnect hard macros and wires. The overlay hard macros, such as interconnect hard macros and wires, may be DL2 level attributes (or constraints) of the DL1 wrapper. In various embodiments, the wrapper may be used in IC, such as SOC, functional hard macro planning. For example, the floorplan shape of the functional hard macro and planning for well creation in the functional hard macro to align with the indications of empty boundary zones may be performed using a DL1 wrapper according to various embodiments including the overlay hard macros.

Various embodiments may include overlay hard macros that support routing and communication design without dedicated communication channels being needed between functional hard macros, such as cores of a SOC. Various embodiments may enable the design of ICs, such as SOCs, that support communication pathways between two functional hard macros across the IC space assigned to one or more other functional hard macros. By enabling communication pathways through other functional hard macros, various embodiments may enable ICs, such as SOCs, to be designed without die area being dedicated (or reserved) to communication channels separate from the die area dedicated (or reserved) to functional hard macros.

FIG. 1 is a component block diagram illustrating an example SOC 100 including a communication channel 150. While FIG. 1 illustrates one communication channel 150, there may be more than one communication channel included in a SOC, such as SOC 100, and not all communication channels included in a SOC may be connected to one another. The SOC 100 may include a series of functional hard macros including a multimedia core 102, a CPU core 106, a power infrastructure core 112, a memory core, such as a double data rate (DDR) memory core 110, a modem core 114, a GPU core 116, NSP core 108, and a PCIE core 104. The SOC 100 may be a conventionally designed IC in which die area is dedicated (or reserved) to the communication channel 150 separate from the die area dedicated (or reserved) for functional hard macros, specifically the multimedia core 102, the CPU core 106, the power infrastructure core 112, the DDR memory core 110, the modem core 114, the GPU core 116, the NSP core 108, and the PCIE core 104.

The communication channel 150 may be allocated and designed to support interconnection macros and wires to connection one or more of the multimedia core 102, the CPU core 106, the power infrastructure core 112, the DDR memory core 110, the modem core 114, the GPU core 116, NSP core 108, and the PCIE core 104. As the communication channel 150 physically separates the functional hard macros, such as the multimedia core 102, the CPU core 106, the power infrastructure core 112, the DDR memory core 110, the modem core 114, the GPU core 116, NSP core 108, and the PCIE core 104 from one another, the communication channel 150 adds to the overall die area needed for the SOC 100 beyond any die area needed for the functional hard macros themselves.

Figure 2:
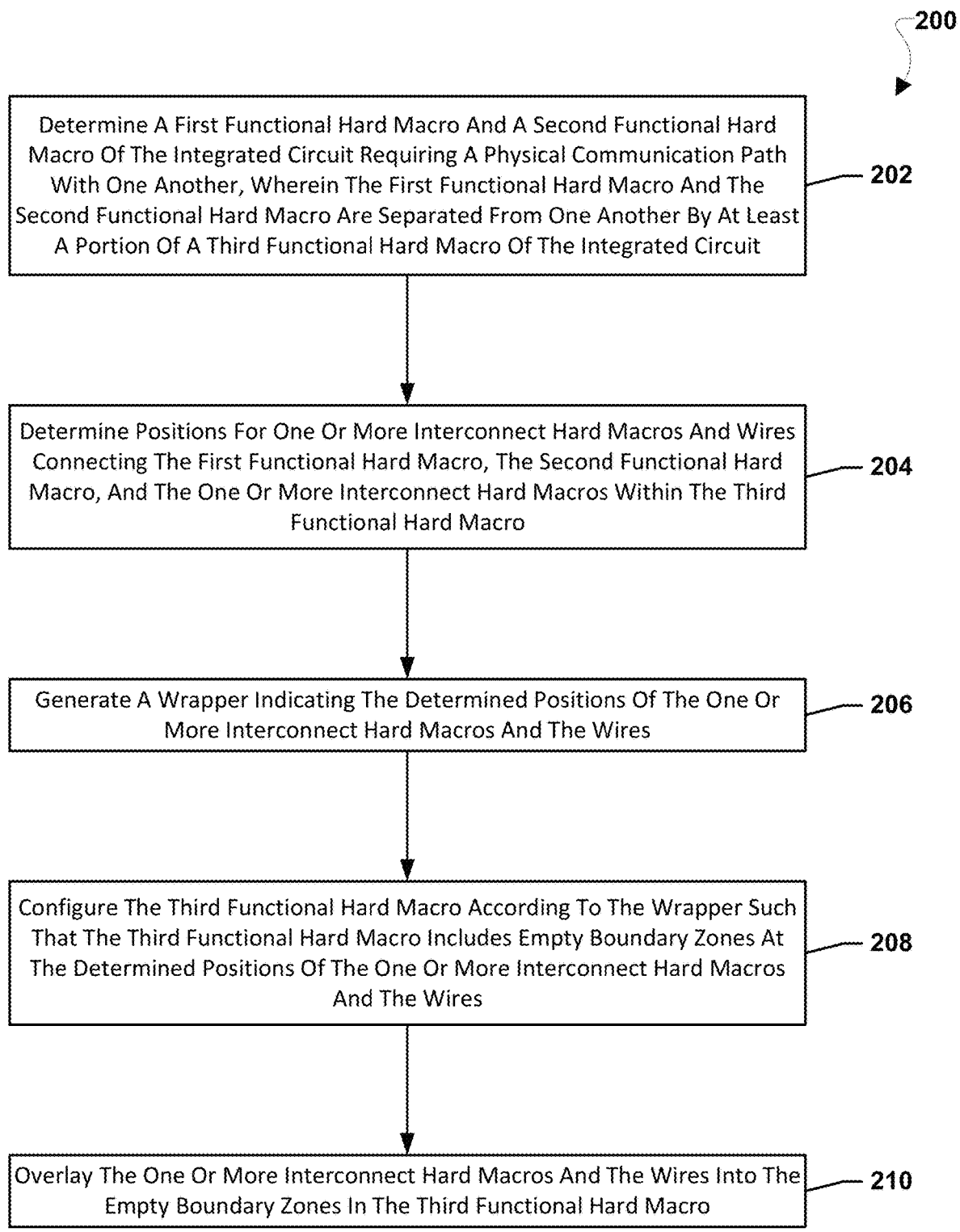
FIG. 2 is a process flow diagram illustrating an embodiment method for designing an integrated circuit.

FIG. 2 is a process flow diagram illustrating an embodiment method 200 for designing an integrated circuit. With reference to FIGS. 1-2, in various embodiments, the operations of the method 200 may be performed by a processor of a computing device. In various embodiments, the operations of the method 200 may enable ICs, such as SOCs, to be designed without die area being dedicated (or reserved) to communication channels separate from the die area dedicated (or reserved) to functional hard macros. In some embodiments, the method 200 may be implemented in a computer-based tool in which a processor is configured to perform operations of the method.

In block 202, the processor may determine a first functional hard macro and a second functional hard macro of the integrated circuit requiring a physical communication path with one another, wherein the first functional hard macro and the second functional hard macro are separated from one another by at least a portion of a third functional hard macro of the integrated circuit. For example, the processor may determine a first functional hard macro and a second functional hard macro of the integrated circuit requiring a physical communication path with one another by receiving an indication of a selection by a user of the computing device of a first functional hard macro, such as a PCIE core of a SOC, and an indication of a selection of a second functional hard macro, such as a DDR memory core of the SOC, with which the first functional hard macro may need to communicate. The first functional hard macro, such as the PCIE core, may be assigned a first dedicated (or reserved) area on the die for the SOC and the second functional hard macro, such as the DDR memory core, may be assigned a second dedicated (or reserved) area on the die of the SOC. Based on the layout of the SOC, a third functional hard macro, such as a multimedia core, may be positioned in third dedicated (or reserved) area on the die of the SOC such that at least a portion of the third functional hard macro separates the first functional hard macro, such as the PCIE core, from the second functional hard macro, such as the DDR memory core.

In block 204, the processor may determine positions for one or more interconnect hard macros and wires connecting the first functional hard macro, the second functional hard macro, and the one or more interconnect hard macros within the third functional hard macro. For example, based on constraints (or requirements) for timing delay, communication power consumption, and/or communication distance thresholds, the processor may determine positions for one or more interconnect hard macros and wires to connect the first functional hard macro, such as the PCIE core, to the second functional hard macro, such as the DDR memory core. As a specific example, the positions of one or more communication pipeline hard macros may be determined based at least in part on delay thresholds and frequency requirements for communications between the first functional hard macro, such as the PCIE core, to the second functional hard macro, such as the DDR memory core. The positions for the one or more interconnect hard macros may be determined within the third functional hard macro such that a communication pathway from the first functional hard macro, such as the PCIE core, to the second functional hard macro, such as the DDR memory core, may cross the die area dedicated (or reserved) to the third functional macro, such as the multimedia core. The positions of the one or more interconnect hard macros and wires may be determined such that the positions of the one or more interconnect hard macros and wires may support the first functional hard macro being electronically coupled to the second hard macro through the one or more interconnect hard macros and the wires.

In block 206, the processor may generate a wrapper indicating the determined positions of the one or more interconnect hard macros and the wires. For example, the generated wrapper may be a DL1 wrapper indicating the determined positions of the one or more interconnect hard macros and the wires within the third functional hard macro, such as the multimedia core. The DL1 wrapper may include indications of empty boundary zones within the third functional hard macro, such as the multimedia core, which are to remain open during design of the third functional hard macro, such as the multimedia core. The indications of empty boundary zones within the third functional hard macro, such as the multimedia core, may be DL2 level hard macros or attributes (or constraints) of the DL1 wrapper. The DL1 wrapper may include overlay hard macros, such as interconnect hard macros and wires to fill the empty boundary zones as DL2 level hard macros or attributes (or constraints).

In block 208, the processor may configure the third functional hard macro according to the wrapper such that the third functional hard macro includes empty boundary zones at the determined positions of the one or more interconnect hard macros and the wires. In various embodiments, the wrapper may be used in IC, such as SOC, functional hard macro planning. For example, the floorplan shape of the third functional hard macro, such as the multimedia core, and planning for well creation in the third functional hard macro, such as the multimedia core, to align with the indications of empty boundary zones may be performed using the DL1 wrapper.

In block 210, the processor may overlay the one or more interconnect hard macros and the wires into the empty boundary zones in the third functional hard macro. In this manner, the design of the overall IC, such as the overall IC, may include the one or more interconnect hard macros and wires within the wells in the third functional hard macro, such as the multimedia core, corresponding to the empty boundary zones defined by the DL1 wrapper. As an example, the interconnect hard macros and wires may fill the empty boundary zones such that the first functional hard macro may be electronically coupled to the second hard macro through the one or more interconnect hard macros and the wires. In addition to being within the empty boundary zones, in various embodiments the wires may extend outside the empty boundary zones.

Figure 3A:
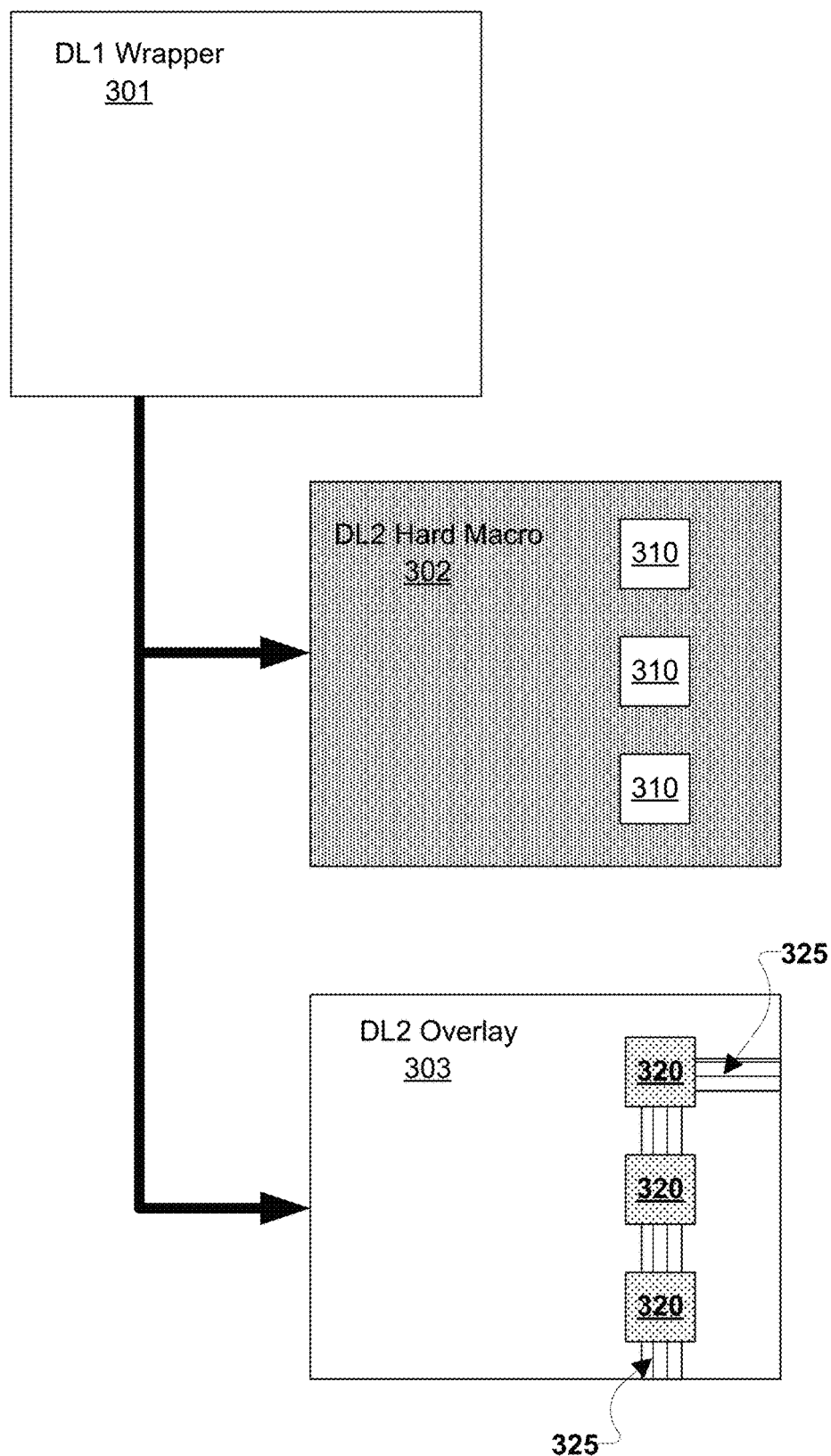
FIG. 3A is a hierarchical block diagram of constituent parts of a wrapper according to various embodiments.

FIG. 3A is a hierarchical block diagram of constituent parts of a DL1 wrapper 301 according to various embodiments. With reference to FIGS. 1-3A, the DL1 wrapper 301 may be wrapper generated according to the operations of method 200 (FIG. 2). The DL1 wrapper 301 may include a DL2 hard macro 302 including empty boundary zones 310 and a DL2 overlay 303 including positions of interconnect hard macros 320 and wires 325. As a specific example, the interconnect hard macros 320 may be communication pipeline hard macros.

Figure 3B:
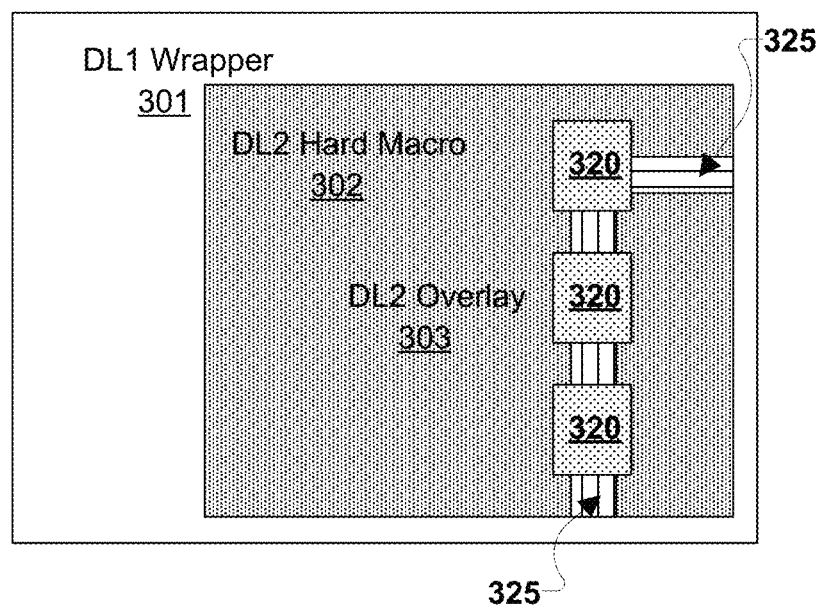
FIG. 3B is a block diagram of the wrapper of FIG. 3A according to various embodiments.

FIG. 3B is a block diagram of the DL1 wrapper 301 showing the alignment between the DL2 hard macro 302 and the DL2 overlay 303 when the DL2 overlay 303 is overlaid with the DL2 hard macro 302 in the DL1 wrapper 301. With reference to FIGS. 1-3B, the positions of interconnect hard macros 320 and wires 325 align with the empty boundary zones 310 such that the DL2 hard macro 302 entirely surrounds the interconnect hard macros 320. In this manner, the die area of the DL2 hard macro 302 may include within it the interconnect hard macros 320.

Figure 4:
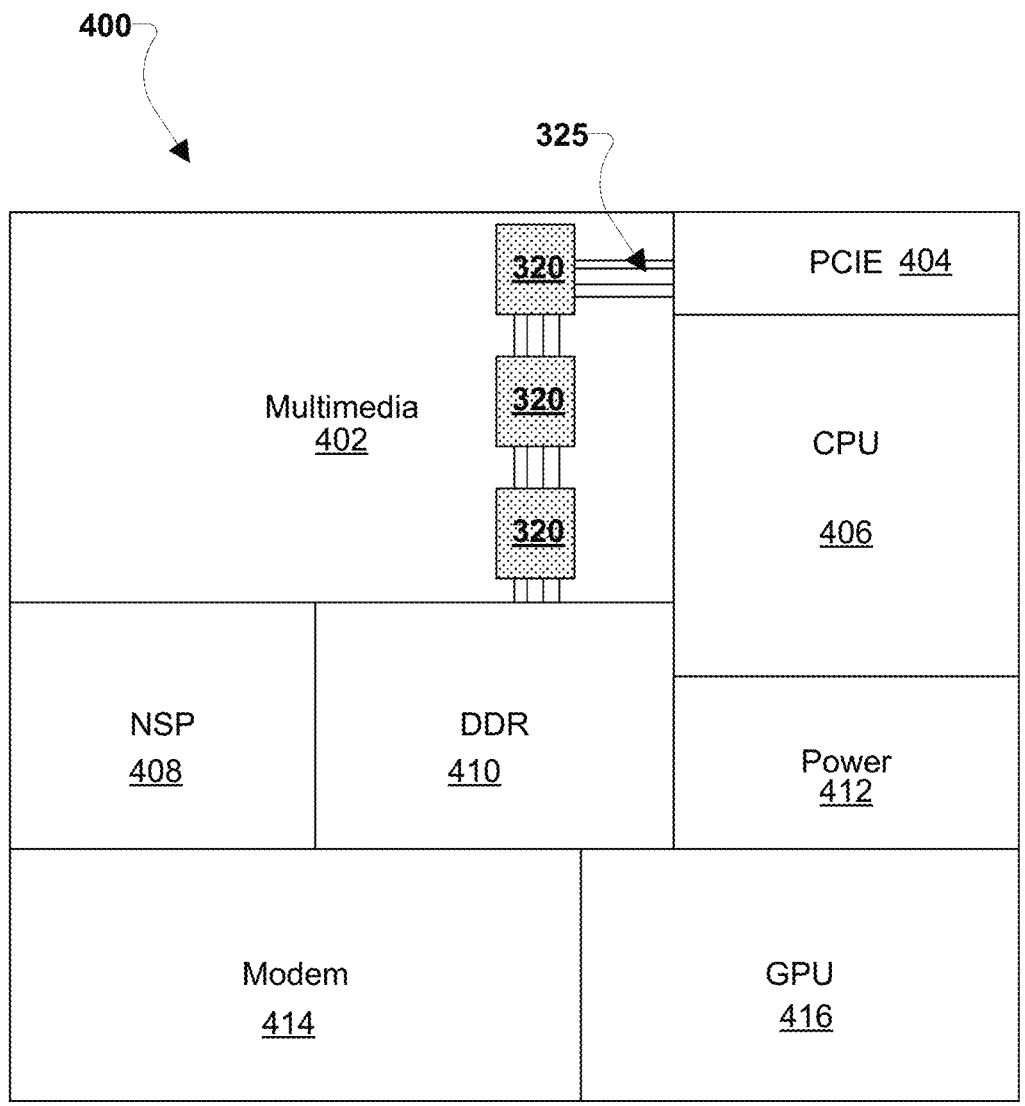
FIG. 4 is a component block diagram illustrating an example SOC according to various embodiments having interconnect hard macros located with a core of the SOC.

FIG. 4 is a component block diagram illustrating an example SOC 400 according to various embodiments. With reference to FIGS. 1-4, the SOC 400 may include interconnect hard macros 320 located within a functional hard macro, such as a multimedia core 402, of the SOC 400. The SOC 400 may include a series of functional hard macros including a multimedia core 402, a CPU core 406, a power infrastructure core 412, a memory core, such as a DDR memory core 110, a modem core 414, a GPU core 416, NSP core 408, and a PCIE core 404. The SOC 400 may be an example of an IC designed according to the operations of method 200 (FIG. 2). For example, the DL1 wrapper 301 may be used to establish a communication path between the PCIE core 404 and the DDR memory core 410 through the multimedia core 402. In various embodiments, according to the DL1 wrapper 301, the interconnect hard macros 320 may be located within the multimedia core 402 and the wires 325 may connect the PCIE core 404, the interconnect hard macros 320, and the DDR memory core 410. In this manner, the PCIE core 404 may electronically couple to the DDR memory core 410 through the interconnect hard macros 320 and the wires 325.

As illustrated in FIG. 4, although the PCIE core 404 and the DDR memory core 410 abut different sides of the multimedia core 402 (e.g., a right side and a bottom side in the orientation of FIG. 4) and the multimedia core 402 physically separates the PCIE core 404 from the DDR memory core 410, no communication channel between the multimedia core 402, PCIE core 404, and DDR memory core 410 is present in the SOC 400. As illustrated in FIG. 4, sides of the PCIE core 404 and DDR memory core 410 do not abut. The lack of communication channel in the SOC 400 may be seen in a comparison between the SOC 100 (FIG. 1) that includes the communication channel 150 and the embodiment SOC 400 (FIG. 4), which is channel-less. No dedicated (or reserved) communication channel is needed in embodiment SOC 400 separate from the die area dedicated (or reserved) to multimedia core 402, PCIE core 404, and DDR memory core 410 because the DL1 wrapper 301 may enable the FIG interconnect hard macros 320 and wires 325 to be located within the die area dedicated (or reserved) to multimedia core 402. In this manner, PCIE core 404 and DDR memory core 410 may communicate via the interconnect hard macros 320 and wires 325 without the presence of a dedicated (or reserved) communication channel between the PCIE core 404 and DDR memory core 410.

Figure 5:
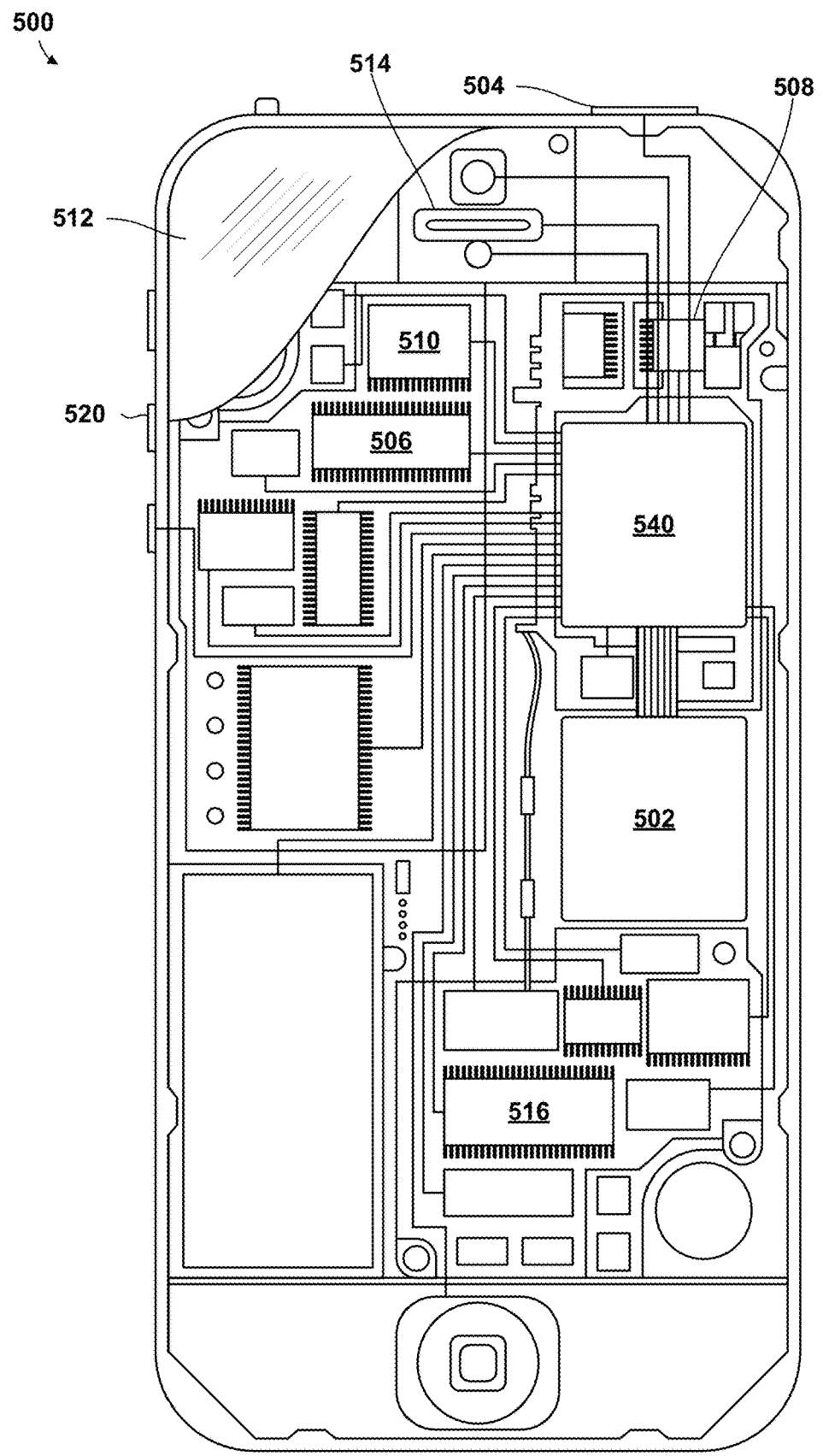
FIG. 5 is a component block diagram of a computing device suitable for use with various embodiments.

FIG. 5 is a component block diagram of a computing device in the form of a smartphone 500 suitable for implementing some embodiments (including, but not limited to, aspects described above with reference to FIGS. 2-4). With reference to FIGS. 1-5, the smartphone 500 may implement operations of method 200 and/or may use an IC, such as SOC 400, designed according to various embodiments. The smartphone 500 may include a first SOC 540 (such as a SOC-CPU) coupled to a second SOC 502 (such as a 5G capable SOC). As one specific example, the SOC 502 may be the SOC 400. The first and second SOCs 540, 502 may be coupled to internal memory 516, 506, a display 512, and to a speaker 514. Additionally, the smartphone 500 may include an antenna 504 for sending and receiving electromagnetic radiation that may be connected to a wireless data link or cellular telephone transceiver 508 coupled to one or more processors in the first or second SOCs 540, 502. For example, the antenna 504 may be used to electrically connect and issue configuration and mission mode memory access commands to an external memory device. Smartphones 500 typically also include menu selection buttons or rocker switches 520 for receiving user inputs.

A typical smartphone 500 also includes a sound encoding/decoding (CODEC) circuit 510, which digitizes sound received from a microphone into data packets suitable for wireless transmission and decodes received sound data packets to generate analog signals that are provided to the speaker to generate sound. Also, one or more of the processors in the first and second SOCs 540, 502, wireless transceiver 508, and CODEC 510 may include a digital signal processor (DSP) circuit (not shown separately).

Figure 6:
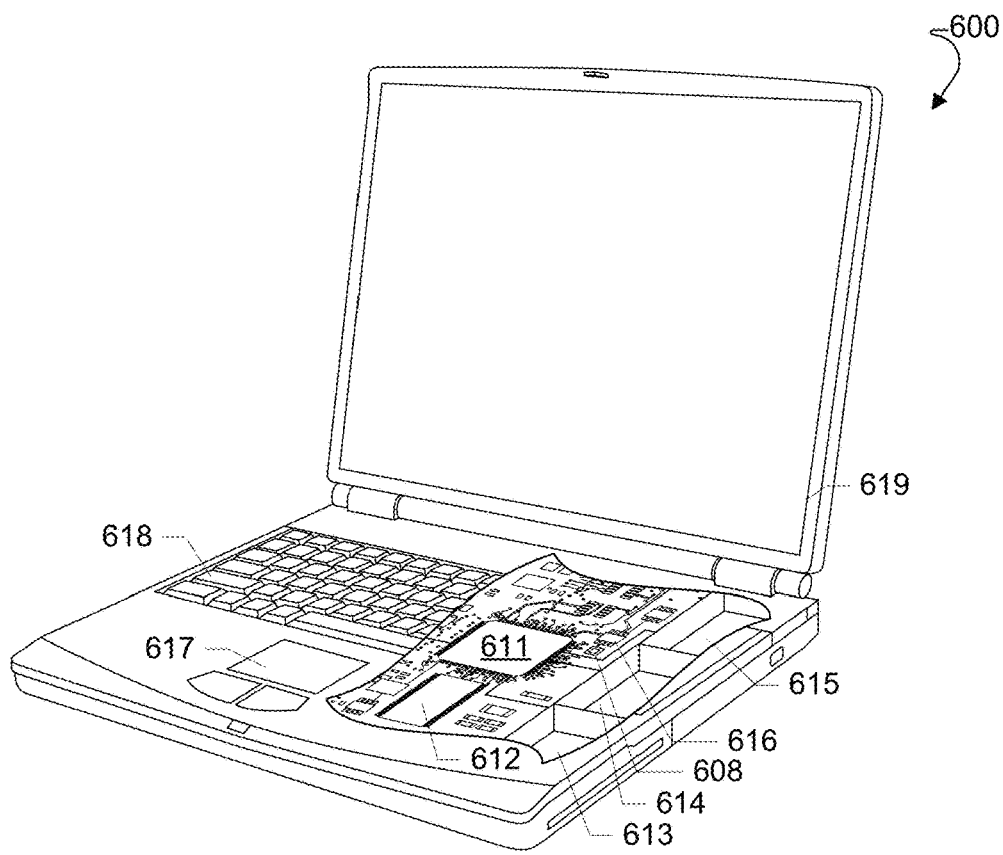
FIG. 6 is a component block diagram illustrating an example computing device suitable for use with various embodiments.

The various aspects (including, but not limited to, aspects described above with reference to FIGS. 2-4) may be implemented in a wide variety of computing systems include a laptop computer 600 an example of which is illustrated in FIG. 6. With reference to FIGS. 1-6, the laptop computer 600 may implement operations of method 200 and/or may use an IC, such as SOC 400, designed according to various embodiments. Many laptop computers include a touchpad touch surface 617 that serves as the computer's pointing device, and thus may receive drag, scroll, and flick gestures similar to those implemented on computing devices equipped with a touch screen display and described above. A laptop computer 600 will typically include a processor 611 coupled to volatile memory 612 and a large capacity nonvolatile memory, such as a disk drive 613 of Flash memory. Additionally, the computer 600 may have one or more antenna 608 for sending and receiving electromagnetic radiation that may be connected to a wireless data link and/or cellular telephone transceiver 616 coupled to the processor 611. The computer 600 may also include a floppy disc drive 614 and a compact disc (CD) drive 615 coupled to the processor 611. In a notebook configuration, the computer housing includes the touchpad 617, the keyboard 618, and the display 619 all coupled to the processor 611. As one specific example, the processor 611 may be the SOC 400. Other configurations of the computing device may include a computer mouse or trackball coupled to the processor (e.g., via a universal serial bus (USB) input) as are well known, which may also be used in conjunction with the various aspects.

Figure 7:
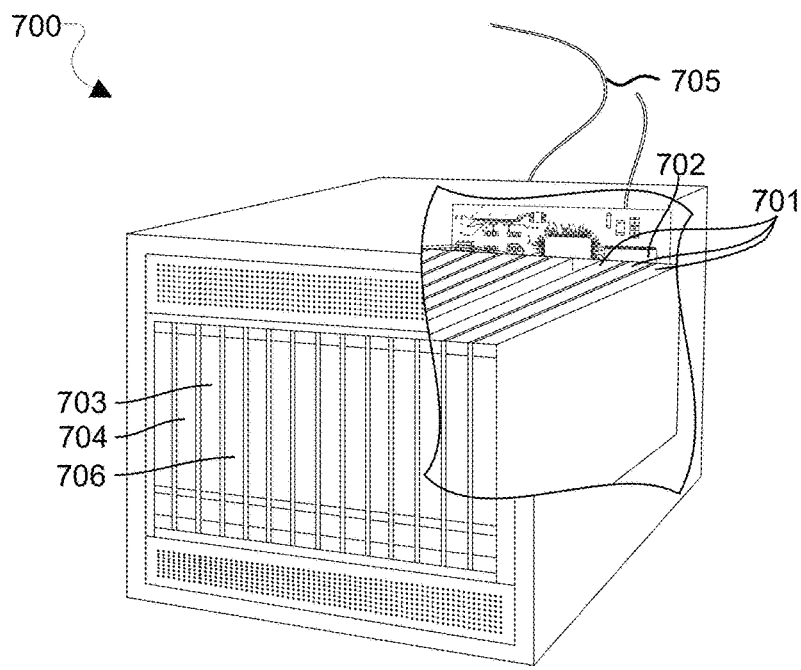
FIG. 7 is a component block diagram illustrating an example computing device suitable for use with various embodiments.

The various aspects (including, but not limited to, aspects described above with reference to FIGS. 2-4) may also be implemented in fixed computing systems, such as any of a variety of commercially available servers, such as server 700 of FIG. 7. With reference to FIGS. 1-7, a server 700 may implement operations of method 200 and/or may use an IC, such as SOC 400, designed according to various embodiments. Such a server 700 typically includes one or more processor assemblies 701 coupled to volatile memory 702 and a large capacity nonvolatile memory, such as a disk drive 704. As illustrated in FIG. 7, processor assemblies 701 may be added to the server 700 by inserting them into the racks of the assembly. As one specific example, the processor assemblies 701 may be, or may include, SOC 400. The server 700 may also include a floppy disc drive, compact disc (CD) or digital versatile disc (DVD) disc drive 706 coupled to the processor assemblies 701. The server 700 may also include network access ports 703 coupled to the processor assemblies 701 for establishing network interface connections with a network 705, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 400, 540, 502, 611, 701 may be any programmable microprocessor, microcomputer or multiple processor chip or chips that may be configured by processor-executable instructions to perform a variety of functions, including the functions of the various embodiments described herein. In some computing devices, multiple processors may be provided, such as one processor within the SOC 502 dedicated to wireless communication functions and one processor within the SOC 540 dedicated to running other applications. Typically, software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods disclosed herein may be substituted for or combined with one or more operations of the methods disclosed herein.

Implementation examples are described in the following paragraphs. While some of the implementation examples are described in terms of example methods, further example implementations may include: the example methods discussed in the following paragraphs implemented by a computing device comprising a processor configured with processor-executable instructions to perform operations of the methods of the implementation examples; the example methods discussed in the following paragraphs implemented by a computing device comprising means for performing functions of the methods of the implementation examples; and the example methods discussed in the following paragraphs may be implemented as a non-transitory processor-readable storage medium having stored thereon processor-executable instructions configured to cause a processor of a computing device to perform the operations of the methods of the implementation examples. While some of the implementation examples are described in terms of example integrated circuits, further example implementations may include devices comprising an integrated circuit of the implementation examples.

Example 1: An integrated circuit, comprising: a first functional hard macro; a second functional hard macro; a third functional hard macro; one or more interconnect hard macros, the one or more interconnect hard macros located within the third functional hard macro; and wires connecting the first functional hard macro, the second functional hard macro, and the one or more interconnect hard macros.

Example 2: The integrated circuit of example 1, wherein the first functional hard macro electronically couples to the second functional hard macro through the one or more interconnect hard macros and the wires.

Example 3: The integrated circuit of any of examples 1-2, wherein sides of the first functional hard macro and sides of the second functional hard macro do not abut.

Example 4: The integrated circuit of any of examples 1-2, wherein the first functional hard macro and second functional hard macro abut different sides of the third functional hard macro.

Example 5: The integrated circuit of any of examples 1-4, wherein no communication channel is present between the first functional hard macro, the second functional hard macro, and the third functional hard macro.

Example 6: The integrated circuit of any of examples 1-5, wherein the third functional hard macro entirely surrounds the one or more interconnect hard macros.

Example 7: The integrated circuit any of examples 1-6, wherein the one or more interconnect hard macros comprise communication pipeline hard macros.

Example 8: The integrated circuit of any of examples 1-7, wherein: the integrated circuit comprises a system-on-chip (SOC); and the first functional hard macro, the second functional hard macro, and the third functional hard macro comprise a first core, a second core, and a third core, respectively.

Example 9: A method for designing an integrated circuit, comprising: determining a first functional hard macro and a second functional hard macro of the integrated circuit requiring a physical communication path with one another, wherein the first functional hard macro and the second functional hard macro are separated from one another by at least a portion of a third functional hard macro of the integrated circuit; determining positions for one or more interconnect hard macros and wires connecting the first functional hard macro, the second functional hard macro, and the one or more interconnect hard macros within the third functional hard macro; generating a wrapper indicating the determined positions of the one or more interconnect hard macros and the wires; and configuring the third functional hard macro according to the wrapper such that the third functional hard macro includes empty boundary zones at the determined positions of the one or more interconnect hard macros and the wires.

Example 10: The method of example 9, further comprising overlaying the one or more interconnect hard macros and the wires into the empty boundary zones in the third functional hard macro.

Example 11: The method of any of examples 9-10, wherein the first functional hard macro, the second functional hard macro, and the third functional hard macro are configured such that no communication channel is present between the first functional hard macro, the second functional hard macro, and the third functional hard macro.

Example 12: The method of any of examples 9-11, wherein the one or more interconnect hard macros comprise communication pipeline hard macros.

Example 13: The method of any of examples 9-12, wherein: the integrated circuit comprises a system-on-chip (SOC); and the first functional hard macro, the second functional hard macro, and the third functional hard macro comprise a first core, a second core, and a third core, respectively.

The foregoing method descriptions and the process flow diagrams are provided merely as illustrative examples and are not intended to require or imply that the blocks of various embodiments may be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Embodiments of the subject matter described in this specification also may be implemented as one or more computer programs, i.e. one or more modules of computer program instructions, encoded on a computer storage media for execution by, or to control the operation of, data processing apparatus.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc in which disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the embodiments described in this disclosure may be readily apparent to those skilled in the art, and the generic principles defined herein may be applied to other embodiments without departing from the scope of the claims. Thus, the claims are not intended to be limited to the embodiments shown herein, but are to be accorded the widest scope consistent with this disclosure, the principles and the novel features disclosed herein.

What is claimed is:

1. An integrated circuit, comprising:
    a first functional hard macro;
    a second functional hard macro;
    a third functional hard macro;
    one or more interconnect hard macros, the one or more interconnect hard macros located within the third functional hard macro; and
    wires connecting the first functional hard macro, the second functional hard macro, and the one or more interconnect hard macros.

2. The integrated circuit of claim 1, wherein the first functional hard macro electronically couples to the second functional hard macro through the one or more interconnect hard macros and the wires.

3. The integrated circuit of claim 1, wherein sides of the first functional hard macro and sides of the second functional hard macro do not abut.

4. The integrated circuit of claim 1, wherein the first functional hard macro and second functional hard macro abut different sides of the third functional hard macro.

5. The integrated circuit of claim 4, wherein no communication channel is present between the first functional hard macro, the second functional hard macro, and the third functional hard macro.

6. The integrated circuit of claim 1, wherein the third functional hard macro entirely surrounds the one or more interconnect hard macros.

7. The integrated circuit of claim 1, wherein the one or more interconnect hard macros comprise communication pipeline hard macros.

8. The integrated circuit of claim 1, wherein:
    the integrated circuit comprises a system-on-chip (SOC); and
    the first functional hard macro, the second functional hard macro, and the third functional hard macro comprise a first core, a second core, and a third core, respectively.

9. A method for designing an integrated circuit, comprising:
    determining a first functional hard macro and a second functional hard macro of the integrated circuit requiring a physical communication path with one another, wherein the first functional hard macro and the second functional hard macro are separated from one another by at least a portion of a third functional hard macro of the integrated circuit;
    determining positions for one or more interconnect hard macros and wires connecting the first functional hard macro, the second functional hard macro, and the one or more interconnect hard macros within the third functional hard macro;
    generating a wrapper indicating the determined positions of the one or more interconnect hard macros and the wires; and
    configuring the third functional hard macro according to the wrapper such that the third functional hard macro includes empty boundary zones at the determined positions of the one or more interconnect hard macros and the wires.

10. The method of claim 9, further comprising overlaying the one or more interconnect hard macros and the wires into the empty boundary zones in the third functional hard macro.

11. The method of claim 9, wherein the first functional hard macro, the second functional hard macro, and the third functional hard macro are configured such that no communication channel is present between the first functional hard macro, the second functional hard macro, and the third functional hard macro.

12. The method of claim 9, wherein the one or more interconnect hard macros comprise communication pipeline hard macros.

13. The method of claim 9, wherein:
    the integrated circuit comprises a system-on-chip (SOC); and
    the first functional hard macro, the second functional hard macro, and the third functional hard macro comprise a first core, a second core, and a third core, respectively.

14. A computing device, comprising:
    a processor configured with processor executable instructions to:

determine a first functional hard macro and a second functional hard macro of an integrated circuit requiring a physical communication path with one another, wherein the first functional hard macro and the second functional hard macro are separated from one another by at least a portion of a third functional hard macro of the integrated circuit;

determine positions for one or more interconnect hard macros and wires connecting the first functional hard macro, the second functional hard macro, and the one or more interconnect hard macros within the third functional hard macro;

generate a wrapper indicating the determined positions of the one or more interconnect hard macros and the wires; and configure the third functional hard macro according to the wrapper such that the third functional hard macro includes empty boundary zones at the determined positions of the one or more interconnect hard macros and the wires.

15. The computing device of claim 14, wherein the processor is further configured with processor executable instructions to overlay the one or more interconnect hard macros and the wires into the empty boundary zones in the third functional hard macro.

16. The computing device of claim 14, wherein the processor is configured with processor executable instructions such that the first functional hard macro, the second functional hard macro, and the third functional hard macro are configured such that no communication channel is present between the first functional hard macro, the second functional hard macro, and the third functional hard macro.

17. The computing device of claim 14, wherein the one or more interconnect hard macros comprise communication pipeline hard macros.

18. The computing device of claim 14, wherein:
the integrated circuit comprises a system-on-chip (SOC); and
the first functional hard macro, the second functional hard macro, and the third functional hard macro comprise a first core, a second core, and a third core, respectively.

19. A non-transitory processor readable medium having stored thereon processor-executable instructions configured to cause a processor of a computing device to perform operations comprising:
determining a first functional hard macro and a second functional hard macro of an integrated circuit requiring a physical communication path with one another, wherein the first functional hard macro and the second functional hard macro are separated from one another by at least a portion of a third functional hard macro of the integrated circuit;

determining positions for one or more interconnect hard macros and wires connecting the first functional hard macro, the second functional hard macro, and the one or more interconnect hard macros within the third functional hard macro;

generating a wrapper indicating the determined positions of the one or more interconnect hard macros and the wires; and configuring the third functional hard macro according to the wrapper such that the third functional hard macro includes empty boundary zones at the determined positions of the one or more interconnect hard macros and the wires.

20. The non-transitory processor readable medium of claim 19, wherein the stored processor-executable instructions are configured to cause a processor of a computing device to perform operations further comprising overlaying the one or more interconnect hard macros and the wires into the empty boundary zones in the third functional hard macro.

21. The non-transitory processor readable medium of claim 19, wherein the stored processor-executable instructions are configured to cause a processor of a computing device to perform operations such that the first functional hard macro, the second functional hard macro, and the third functional hard macro are configured such that no communication channel is present between the first functional hard macro, the second functional hard macro, and the third functional hard macro.

22. The non-transitory processor readable medium of claim 19, wherein the stored processor-executable instructions are configured to cause a processor of a computing device to perform operations such that the one or more interconnect hard macros comprise communication pipeline hard macros.

23. A computing device, comprising:
means for determining a first functional hard macro and a second functional hard macro of an integrated circuit requiring a physical communication path with one another, wherein the first functional hard macro and the second functional hard macro are separated from one another by at least a portion of a third functional hard macro of the integrated circuit;

means for determining positions for one or more interconnect hard macros and wires connecting the first functional hard macro, the second functional hard macro, and the one or more interconnect hard macros within the third functional hard macro;

means for generating a wrapper indicating the determined positions of the one or more interconnect hard macros and the wires; and means for configuring the third functional hard macro according to the wrapper such that the third functional hard macro includes empty boundary zones at the determined positions of the one or more interconnect hard macros and the wires.

24. The computing device of claim 23, further comprising means for overlaying the one or more interconnect hard macros and the wires into the empty boundary zones in the third functional hard macro.

25. The computing device of claim 23, wherein the first functional hard macro, the second functional hard macro, and the third functional hard macro are configured such that no communication channel is present between the first functional hard macro, the second functional hard macro, and the third functional hard macro.

26. The computing device of claim 23, wherein the one or more interconnect hard macros comprise communication pipeline hard macros.

27. The computing device of claim 23, wherein:
the integrated circuit comprises a system-on-chip (SOC); and
the first functional hard macro, the second functional hard macro, and the third functional hard macro comprise a first core, a second core, and a third core, respectively.

* * * * *